US007877453B2

(12) United States Patent
Alexander et al.

(10) Patent No.: US 7,877,453 B2
(45) Date of Patent: Jan. 25, 2011

(54) SYSTEM AND METHOD FOR OPTIMIZING DATA TRAFFIC IN SIGNALING STREAM OF IP MULTIMEDIA SUBSYSTEM SERVICE

(75) Inventors: Michael E. Alexander, Great Valls, VA (US); Sri Ramanathan, Lutz, FL (US); Frank Andre Schaffa, Hartsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 587 days.

(21) Appl. No.: 11/968,279

(22) Filed: Jan. 2, 2008

(65) Prior Publication Data

US 2009/0193069 A1 Jul. 30, 2009

(51) Int. Cl.
*G06F 15/16* (2006.01)
(52) U.S. Cl. ...................................... 709/207; 709/217
(58) Field of Classification Search ................ 709/207, 709/220
See application file for complete search history.

(56) References Cited

U.S. PATENT DOCUMENTS

| 6,934,756 | B2 | 8/2005 | Maes |
| 7,133,923 | B2 | 11/2006 | McLampy et al. |
| 2005/0157660 | A1 | 7/2005 | Mandato et al. |
| 2005/0190772 | A1* | 9/2005 | Tsai et al. ............... 370/395.52 |
| 2006/0294112 | A1 | 12/2006 | Mandato et al. |
| 2007/0043872 | A1 | 2/2007 | Pattan et al. |
| 2007/0064886 | A1* | 3/2007 | Chiu et al. ............... 379/88.17 |
| 2007/0263808 | A1* | 11/2007 | Van Wyk et al. ........ 379/142.01 |
| 2008/0049734 | A1* | 2/2008 | Zhakov et al. ............... 370/352 |
| 2008/0062974 | A1* | 3/2008 | Kikinis et al. ............... 370/356 |
| 2008/0162705 | A1* | 7/2008 | Cai et al. ..................... 709/228 |

FOREIGN PATENT DOCUMENTS

WO WO2007021111 A1 2/2007

OTHER PUBLICATIONS

Kim, et al.; Session and connection management for QoS-Guaranteed multimedia service provisioning on IP/MPLS networks; 2005; abstract only; 1 page.
Ruiz, et al.; Adaptive Multimedia Multi-party Communication in Ad Hoc Environments; IEEE Proceedings of the 37th Hawaii International Conference on System Sciences 2004; 10 pages.
Guenkova-Luy, et al.; End-to-End Quality-of-Service Coordination for Mobile Multimedia Applications; IEEE Journal on Selected Areas in Communications, vol. 22, No. 5, Jun. 2004; pp. 889-903.
Koutsorodi, et al.; Terminal Management and Intelligent Access Selection in Heterogeneous Environments; Mobile Networks and Applications (2006); pp. 861-871.

* cited by examiner

*Primary Examiner*—Hussein A Elchanti
(74) *Attorney, Agent, or Firm*—Schmeiser, Olsen & Watts; John R. Pivnichny

(57) ABSTRACT

A system and associated method for optimizing media data in signaling stream of a network system. A client subscribed for a presence service sends a signaling message embedding media data in an Extensible Markup Language file. An optimizer gateway in the network system intercepts the signaling message, extracts and keeps the media data, replaces the media data in the signaling message with a reference pointer to the media data, asynchronously processes the media data, retransmits the media data to another client subscribing to the presence service, or reinstate the media data from the reference pointer to the media data.

18 Claims, 5 Drawing Sheets

SYSTEM AND METHOD FOR OPTIMIZING DATA TRAFFIC IN SIGNALING STREAM OF IP MULTIMEDIA SUBSYSTEM SERVICE

FIELD OF THE INVENTION

The present invention discloses a system and associated method for optimizing Extensible Markup Language (XML) data traffic embedded in signaling messages of Session Initiated Protocol (SIP) such that the method supports Quality of Service (QoS) of signaling interactions for IP Multimedia Subsystem (IMS) services.

A system and method of optimizing XML traffic to support Quality of Service in Session Initiated Protocol (SIP) based Interactions in IP Multimedia Subsystem Services.

BACKGROUND OF THE INVENTION

Conventional signaling messages are separate from media data. However, contemporary network services tend to embed media data within signaling messages. Signaling messages embedding media data cause lower application server efficiency, longer delay for signaling message processing, lower quality of service for signaling messages communication, etc.

Thus, there is a need for a system and associated method that overcomes at least one of the preceding disadvantages of current methods and systems for conventional handling of SIP messages with data files.

SUMMARY OF THE INVENTION

The present invention provides a method for optimizing a data file in a signaling stream of a network system, the method comprising:

intercepting a first message embedding the data file within the first message, the first message comprising an updated presence information of a subscribed client published by the subscribed client to an application server, wherein presence information comprises a status indicator as to communicability of clients, wherein a subscribing client subscribes to events occurring on the subscribed client, wherein the application server provides presence service which accepts, stores and distributes said presence information of clients registered with a control server, wherein the subscribed client and the subscribing client are registered with the control server, wherein the network system comprises clients, the control server, an optimizer gateway, and the application server;

subsequent to said intercepting the first message, optimizing the first message pursuant to a first quality of service requirement for the first message stored in a subscriber profile database, wherein said optimizing the first message results in an optimized first message;

subsequent to said optimizing the first message, forwarding the optimized first message to the application server;

subsequent to said forwarding the optimized first message, relaying a second message from the application server to the subscribed client, wherein the second message acknowledges that the application server successfully received the optimized first message;

subsequent to said forwarding the second message, intercepting a third message from the application server to the subscribing client, wherein the third message comprises the updated presence information in the intercepted first message;

subsequent to said intercepting the third message, optimizing the third message pursuant to a second quality of service requirement for the third message stored in the subscriber profile database, wherein said optimizing the third message results in an optimized third message; and subsequent to said optimizing the third message, forwarding the optimized third message to the subscribing client, wherein said intercepting the first message, said optimizing the first message, said forwarding the first message, said relaying the second message, said intercepting the third message, said optimizing the third message, and said forwarding the third message are performed by the optimizer gateway, wherein the optimizer gateway communicates with both the application server and the control server, wherein the signaling stream comprises the first message, the second message, and the third message.

The present invention provides a computer program product, comprising a computer usable medium having a computer readable program code embodied therein, said computer readable program code containing instructions that when executed by a processor of a computer system implement a method for optimizing a data file in a signaling stream of a network system, the method comprising:

intercepting a first message embedding the data file within the first message, the first message comprising an updated presence information of a subscribed client published by the subscribed client to an application server, wherein presence information comprises a status indicator as to communicability of clients, wherein a subscribing client subscribes to events occurring on the subscribed client, wherein the application server provides presence service which accepts, stores and distributes said presence information of clients registered with a control server, wherein the subscribed client and the subscribing client are registered with the control server, wherein the network system comprises clients, the control server, an optimizer gateway, and the application server;

subsequent to said intercepting the first message, optimizing the first message pursuant to a first quality of service requirement for the first message stored in a subscriber profile database, wherein said optimizing the first message results in an optimized first message;

subsequent to said optimizing the first message, forwarding the optimized first message to the application server;

subsequent to said forwarding the optimized first message, relaying a second message from the application server to the subscribed client, wherein the second message acknowledges that the application server successfully received the optimized first message;

subsequent to said forwarding the second message, intercepting a third message from the application server to the subscribing client, wherein the third message comprises the updated presence information in the intercepted first message;

subsequent to said intercepting the third message, optimizing the third message pursuant to a second quality of service requirement for the third message stored in the subscriber profile database, wherein said optimizing the third message results in an optimized third message; and subsequent to said optimizing the third message, forwarding the optimized third message to the subscribing client, wherein said intercepting the first message, said optimizing the first message, said forwarding the first message, said relaying the second message, said intercepting the third message, said optimizing the third message, and said forwarding the third message are performed by the optimizer gateway, wherein the optimizer gateway communicates with both the application server and the control server, wherein the signaling stream comprises the first message, the second message, and the third message.

The present invention provides a computer system comprising a processor and a computer readable memory unit coupled to the processor, said memory unit containing instructions that when executed by the processor implement a method for optimizing a data file in a signaling stream of a network system, the method comprising:

intercepting a first message embedding the data file within the first message, the first message comprising an updated presence information of a subscribed client published by the subscribed client to an application server, wherein presence information comprises a status indicator as to communicability of clients, wherein a subscribing client subscribes to events occurring on the subscribed client, wherein the application server provides presence service which accepts, stores and distributes said presence information of clients registered with a control server, wherein the subscribed client and the subscribing client are registered with the control server, wherein the network system comprises clients, the control server, an optimizer gateway, and the application server;

subsequent to said intercepting the first message, optimizing the first message pursuant to a first quality of service requirement for the first message stored in a subscriber profile database, wherein said optimizing the first message results in an optimized first message;

subsequent to said optimizing the first message, forwarding the optimized first message to the application server;

subsequent to said forwarding the optimized first message, relaying a second message from the application server to the subscribed client, wherein the second message acknowledges that the application server successfully received the optimized first message;

subsequent to said forwarding the second message, intercepting a third message from the application server to the subscribing client, wherein the third message comprises the updated presence information in the intercepted first message;

subsequent to said intercepting the third message, optimizing the third message pursuant to a second quality of service requirement for the third message stored in the subscriber profile database, wherein said optimizing the third message results in an optimized third message; and subsequent to said optimizing the third message, forwarding the optimized third message to the subscribing client, wherein said intercepting the first message, said optimizing the first message, said forwarding the first message, said relaying the second message, said intercepting the third message, said optimizing the third message, and said forwarding the third message are performed by the optimizer gateway, wherein the optimizer gateway communicates with both the application server and the control server, wherein the signaling stream comprises the first message, the second message, and the third message.

The present invention provides a process for supporting computer infrastructure, said process comprising providing at least one support service for at least one of creating, integrating, hosting, maintaining, and deploying computer-readable code in a computing system, wherein the code in combination with the computing system is capable of performing a method for optimizing a data file in a signaling stream of a network system, the method comprising:

intercepting a first message embedding the data file within the first message, the first message comprising an updated presence information of a subscribed client published by the subscribed client to an application server, wherein presence information comprises a status indicator as to communicability of clients, wherein a subscribing client subscribes to events occurring on the subscribed client, wherein the application server provides presence service which accepts, stores and distributes said presence information of clients registered with a control server, wherein the subscribed client and the subscribing client are registered with the control server, wherein the network system comprises clients, the control server, an optimizer gateway, and the application server;

subsequent to said intercepting the first message, optimizing the first message pursuant to a first quality of service requirement for the first message stored in a subscriber profile database, wherein said optimizing the first message results in an optimized first message;

subsequent to said optimizing the first message, forwarding the optimized first message to the application server;

subsequent to said forwarding the optimized first message, relaying a second message from the application server to the subscribed client, wherein the second message acknowledges that the application server successfully received the optimized first message;

subsequent to said forwarding the second message, intercepting a third message from the application server to the subscribing client, wherein the third message comprises the updated presence information in the intercepted first message;

subsequent to said intercepting the third message, optimizing the third message pursuant to a second quality of service requirement for the third message stored in the subscriber profile database, wherein said optimizing the third message results in an optimized third message; and subsequent to said optimizing the third message, forwarding the optimized third message to the subscribing client, wherein said intercepting the first message, said optimizing the first message, said forwarding the first message, said relaying the second message, said intercepting the third message, said optimizing the third message, and said forwarding the third message are performed by the optimizer gateway, wherein the optimizer gateway communicates with both the application server and the control server, wherein the signaling stream comprises the first message, the second message, and the third message.

The present invention provides a method and system that overcomes at least one of the current disadvantages of conventional method and system for handling of Session Initiation Protocol (SIP) messages embedding Extensible Markup Language (XML) files.

DETAILED DESCRIPTION OF THE INVENTION

Figure 1:
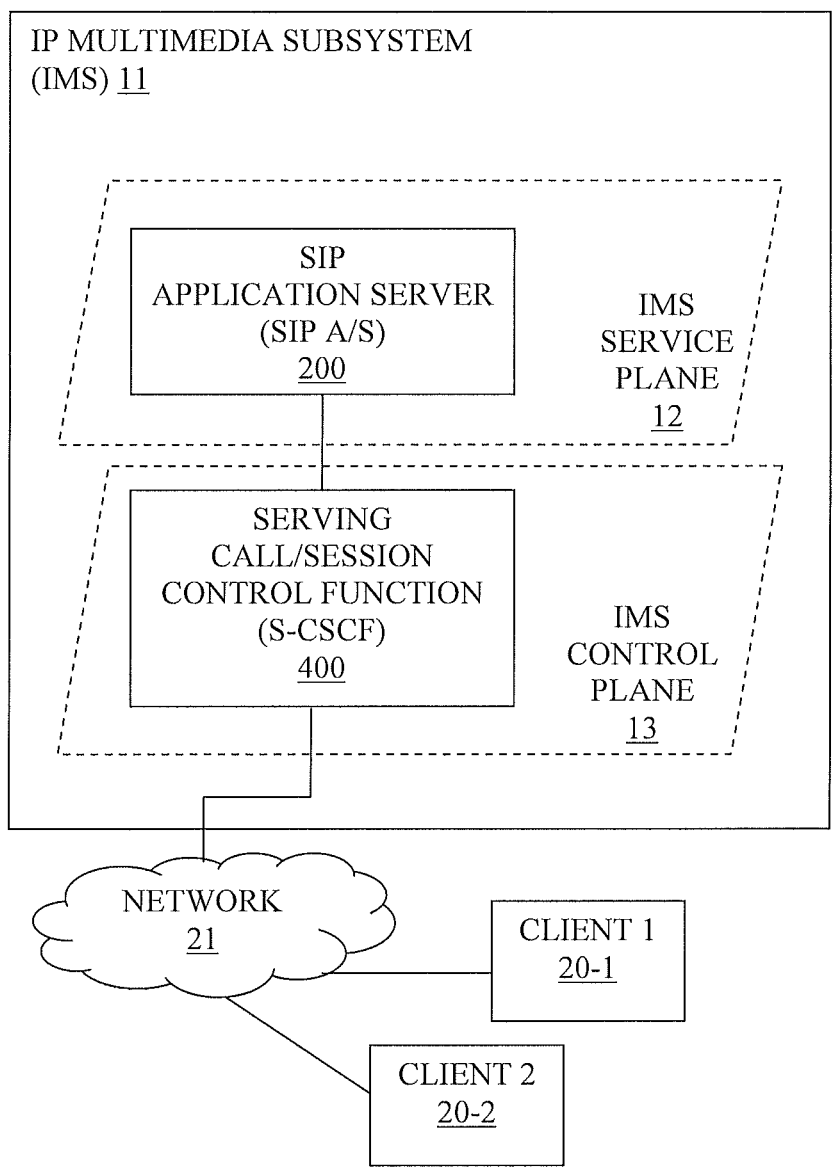
FIG. 1 illustrates a conventional system for handling of Session Initiation Protocol (SIP) messages within which Extensible Markup Language (XML) files are embedded.

FIG. 1 illustrates a conventional system 10 for handling of Session Initiation Protocol (SIP) messages within which Extensible Markup Language (XML) files are embedded. The conventional system 10 comprises an IP Multimedia Subsystem (IMS) 11, a network 21, and clients 20-1 and 20-2.

The IMS 11 is an architectural framework for delivering Internet Protocol (IP) multimedia data to mobile users. The IMS 11 comprises multiple functional layers called an IMS service plane 12 and an IMS control plane 13.

The IMS service plane 12 comprises a Session Initiation Protocol application server (SIP A/S) 200. The SIP Application Server 200 process SIP requests and provides a presence service. See descriptions in FIG. 2, infra, for details of the presence service. The IMS control plane 13 comprises a Serving Call/Session Control Function (S-CSCF) 400. The S-CSCF 400 is a collection of SIP servers or proxies that process SIP signaling packets to control a call/session communicated through the IMS 11.

Any one of said clients 20-1 or 20-2 is a SIP User Agent (UA) which requests SIP services. Examples of clients 20-1, 20-2 may be, inter alia, a mobile phone, a Personal Digital Assistant (PDA), a laptop, a Personal Computer (PC), etc. Clients 20-1, 20-2 communicates with the IMS 11 through the network 21.

Figure 2:
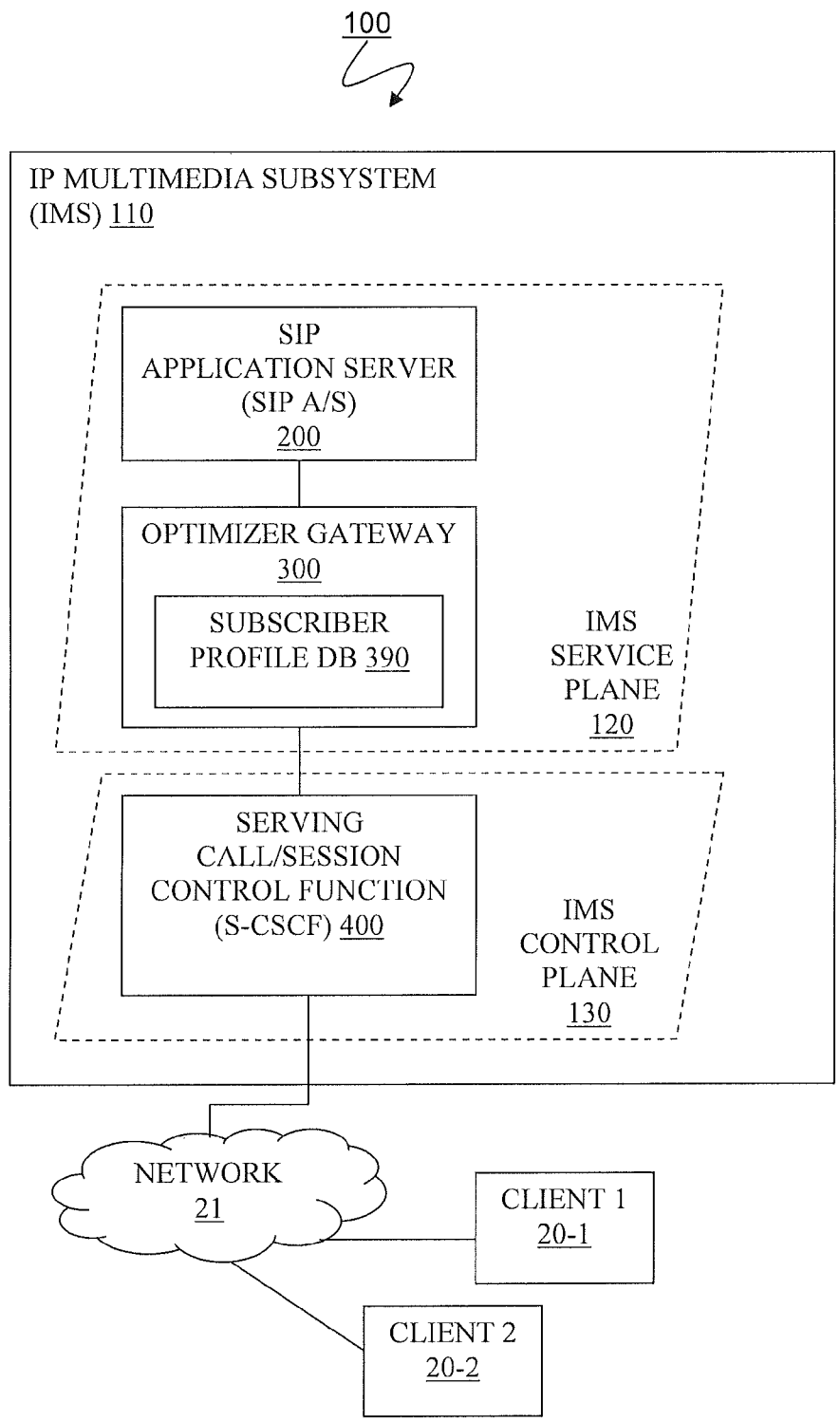
FIG. 2 illustrates a system for optimizing Extensible Markup Language (XML) traffic embedded within Session Initiation Protocol (SIP) messages, in accordance with embodiments of the present invention.

FIG. 2 illustrates a system 100 for optimizing Extensible Markup Language (XML) traffic embedded within Session Initiation Protocol (SIP) messages, in accordance with embodiments of the present invention. The system 100 comprises an IP Multimedia Subsystem (IMS) 110, a network 21, and at least two clients 20-1 and 20-2.

The IMS 110 is an architectural framework for delivering Internet Protocol (IP) multimedia data to mobile users. The IMS 110 comprises multiple functional layers called an IMS service plane 120 and an IMS control plane 130.

The IMS 110 enables service providers to realize a converged network architecture delivering all legacy and new services and applications to be delivered over a common Internet Protocol (IP) based transport backplane. The IMS architecture allows for sessions to be maintained across multiple media channels allowing for multiple complex services to be provided to subscribers while maintaining the necessary carrier grade Quality of Service (QoS).

The Session Initiated Protocol (SIP) is a default signaling protocol used when designing applications and services in the IP Multimedia Subsystem domain. SIP signaling enables a discrete media channel for all media traffic which is separate from a signaling stream. Examples of a discrete media channel may be, inter alia, voice channel, video channel, etc. Thus, SIP messages which are free from media traffic are typically compact and suitable for high volume, low latency processing to keep up with carrier grade requirements of IMS solutions.

However, there are a number of applications within the IMS Service plane 120 that insert media data into SIP signaling messages. Such media data is often in Extensible Markup Language (XML) document formats. An application providing presence services is an example of applications that allow XML data to be transported with SIP messages. A presence service is a network service which accepts, stores and distributes presence information that is a status indicator that conveys ability and willingness of a potential communication partner. An example of presence service is an instant messaging service such as ICQ™, MSN Messenger™, etc. The user whose presence information is available is called a presentity, and users who get presence information are called watchers. In this specification, a subscribed client in the IMS 110 refers to a presentity and a subscribing client in the IMS 110 refers to a watcher.

Session Initiation Protocol (SIP) signaling messages embedding media data introduce following issues to address. First, because there is no restriction on the amount and content of XML documents in a SIP message for an application such as presence servers, SIP messaging can become very inefficient in signaling for media communication. Second, because SIP traffic is a User Datagram Protocol (UDP) based communication, longer SIP messages suffer severe Quality of Service (QoS) problems which are not presented in communications with shorter messages. Third, XML documents gets more complex as IMS based services and applications increase, resulting in larger SIP messages in which XML documents should be communicated. Fourth, because a SIP Application Server needs to assume the added load of XML processing in a nondiscriminatory manner regarding a source of a message, a few bad messages could impact all subscribers of the SIP Application Server. While currently most SIP messages are relatively compact, more extraneous data will be embedded in signaling messages in the future due to an increased use of extensive network application such as presence services.

The IMS service plane 120 comprises a Session Initiation Protocol Application Server (SIP A/S) 200 and an optimizer gateway 300. The SIP Application Server 200 processes SIP requests and provides a presence service. The optimizer gateway 300 comprising a subscriber profile database 390 optimizes Extensible Markup Language (XML) traffic embedded within Session Initiation Protocol (SIP) messages that provide presence services.

The optimizer gateway 300 extracts XML documents from a SIP message and replaces an XML document with a reference pointer to the XML document. The optimizer gateway 300 also looks up the subscriber profile database 390 to determine any necessary Quality of Service (QoS) processing required for an XML document in a SIP message. The optimizer gateway 300 also asynchronously processes an XML document extracted from a SIP message by creating an in-memory representation of the XML document. The optimizer gateway 300 also enhances basic User Datagram Protocol (UDP) based transport semantics by requesting a retransmission in cases when the optimizer gateway 300 receives an XML document in improper format, so that the SIP Application Server 200 can retrieve the XML document later if necessary.

The subscriber profile database 390 contains information on Quality of Service requirements for a specific Session Initiation Protocol (SIP) subscription.

The IMS control plane 130 comprises a Serving Call/Session Control Function (S-CSCF) 400. The S-CSCF 400 is a collection of SIP servers or proxies that process SIP signaling packets to control a call/session communicated through the IMS 110.

Any one of said at least two clients 20-1 or 20-2 is a SIP User Agent (UA) which requests SIP services. Examples of clients 20-1, 20-2 may be, inter alia, a mobile phone, a Personal Digital Assistant (PDA), a laptop, a Personal Computer (PC), etc. Clients 20-1, 20-2 communicate with the IMS 11 through the network 21.

Figure 3:
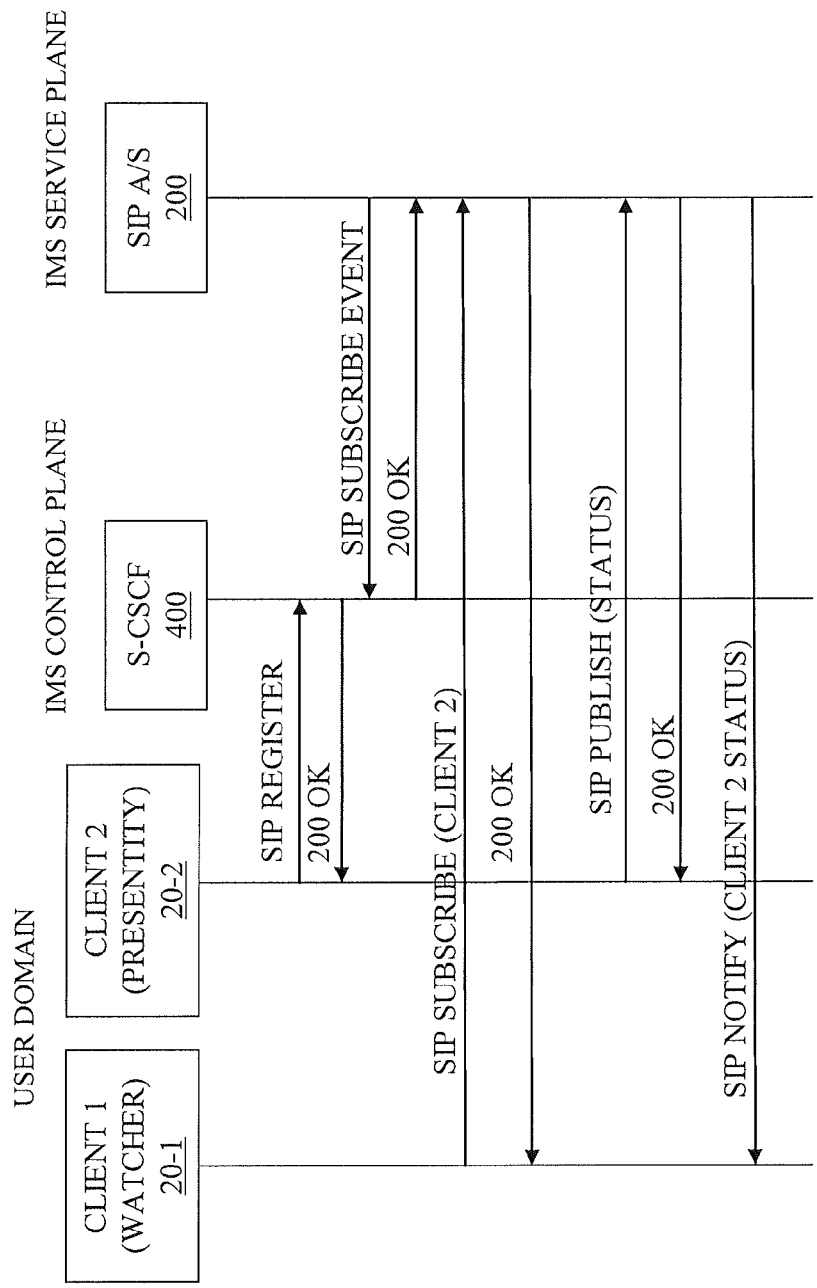
FIG. 3 illustrates a message flow in conventional handling of an Extensible Markup Language (XML) traffic within Session Initiation Protocol (SIP) messages that provides a presence service in the conventional system of FIG. 1, supra.

FIG. 3 illustrates a message flow in conventional handling of an Extensible Markup Language (XML) traffic within Session Initiation Protocol (SIP) messages that provides a presence service in the conventional system 10 of FIG. 1, supra.

A second client 20-2 registers with a Serving Call/Session Control Function (S-CSCF) 400 which is an in-network registrar within the conventional system 10. The S-CSCF 400 resides in the IMS control plane 13. The S-CSCF 400 returns a 200 OK response that indicates the second client 20-2 is successfully registered.

Following the registration, a SIP Application Server (SIP A/S) 200 that provides a presence service subscribes to events with the S-CSCF 400. The S-CSCF 400 returns a 200 OK response that indicates the SIP Application Server 200 is successfully subscribed to events. The SIP Application Server 200 subscribes to events reported to the S-CSCF 400 by all clients registered with the S-CSCF 400.

Subsequent to the registration of the second client 20-2 and the subscription by the SIP Application Server 200, a first client 20-1 that is previously registered to the S-CSCF 400 makes a subscribe request to the SIP Application Server 200 to subscribe to presence information of the second client 20-2. The SIP Application Server 200 returns a 200 OK response that indicates the request was successfully received.

Subsequent to the subscription for presence information of the second client 20-2 by the first client 20-1, the second client 20-2 changes presence information and publishes presence information to the SIP Application Server 200 by sending a SIP PUBLISH message. The presence information or a status of the second client 20-2 to be published embeds XML documents. The SIP Application Server 200 receives the presence information and returns a 200 OK response to the second client 20-2 indicating that the request to publish presence information was successfully received. Also, according to the request to publish presence information by the second client 20-2, the SIP Application Server 200 subsequently publishes the presence information of the second client 20-2 to the first client 20-1 by sending a SIP NOTIFY message which embeds XML documents that is received from the second client 20-2 in the SIP PUBLISH message.

Figure 4:
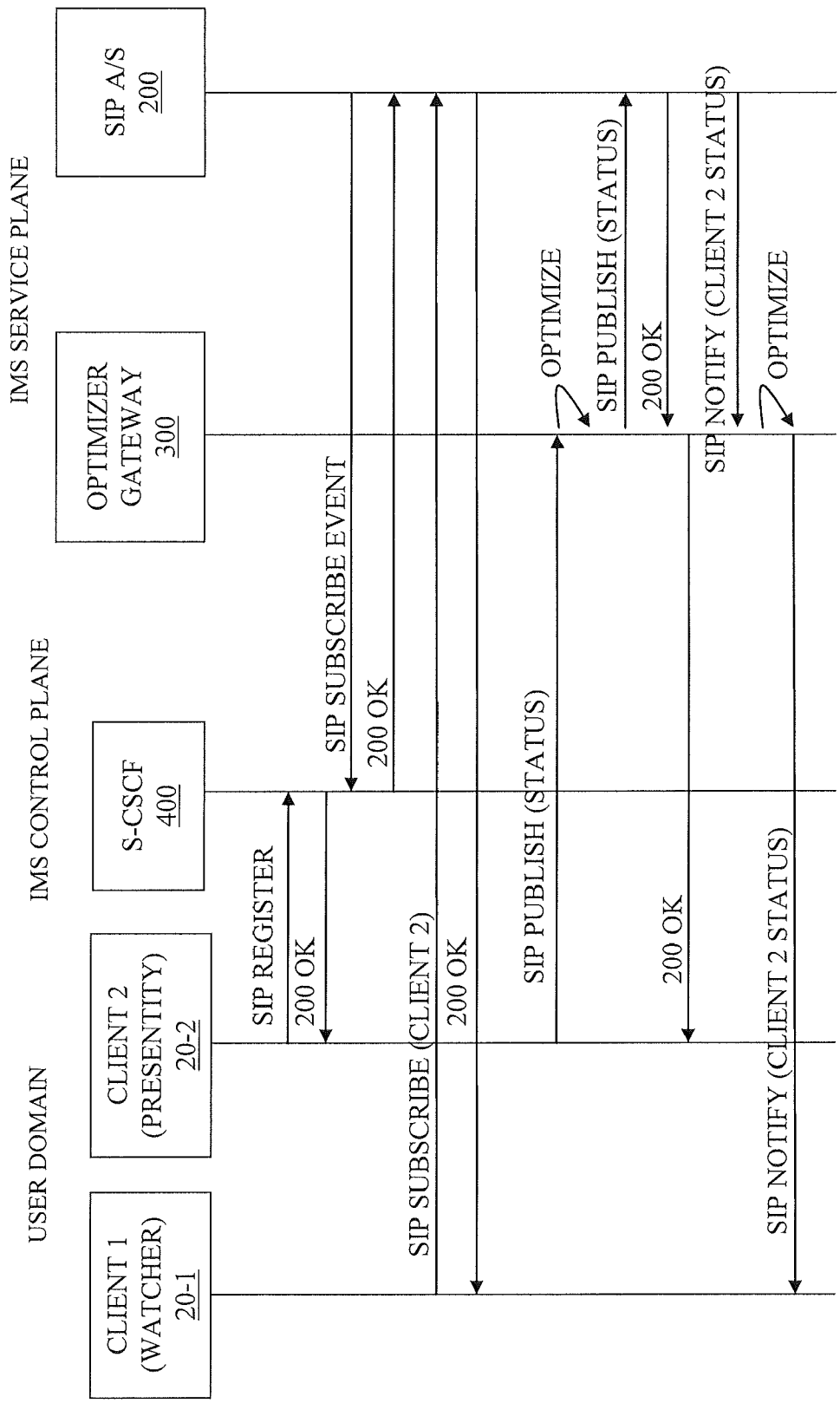
FIG. 4 is a message flowchart depicting a method for optimizing an Extensible Markup Language (XML) traffic in Session Initiation Protocol (SIP) messages that provides a presence service in the system of FIG. 2, supra, in accordance with embodiments of the present invention.

FIG. 4 is a message flowchart depicting a method for optimizing an Extensible Markup Language (XML) traffic in Session Initiation Protocol (SIP) messages that provides a presence service in the system 100 of FIG. 2, supra, in accordance with embodiments of the present invention.

A second client 20-2 registers with a Serving Call/Session Control Function (S-CSCF) 400 which is an in-network registrar within the system 100. The S-CSCF 400 resides in the IMS control plane 130. The S-CSCF 400 returns a 200 OK response that indicates the second client 20-2 is successfully registered.

Following the registration, a SIP Application Server (SIP A/S) 200 that provides a presence service subscribes to events with the S-CSCF 400. The S-CSCF 400 returns a 200 OK response that indicates the SIP Application Server 200 is successfully subscribed to events. The SIP Application Server 200 subscribes to events reported to the S-CSCF 400 by all clients registered with the S-CSCF 400.

Subsequent to the registration of the second client 20-2 and the subscription by the SIP Application Server 200, a first client 20-1 that is previously registered to the S-CSCF 400 makes a subscribe request to the SIP Application Server 200 to subscribe to presence information of the second client 20-2. The SIP Application Server 200 returns a 200 OK response that indicates the request was successfully received.

Subsequent to the subscription for presence information of the second client 20-2 by the first client 20-1, the second client 20-2 changes presence information and publishes presence information to the SIP Application Server 200 by sending a SIP PUBLISH message. The presence information or a status of the second client 20-2 to be published embeds XML documents.

An optimizer gateway 300 intercepts the SIP PUBLISH message that contains presence information of the second client 20-2 before the SIP PUBLISH message reaches the SIP Application Server 200. The optimizer gateway 300 subsequently refers to a subscriber profile database to determine whether any processing for Quality of Service (QoS) is required for the presence information of the second client 20-2. In one embodiment of the present invention, requests are processed according to a predefined priority of communication partners. Requests by communication partners with lower priority are not processed immediately or not processed at all.

The optimizer gateway 300 then extracts the XML document and replaces the XML document with a reference pointer to the XML document. Then the optimizer gateway 300 forwards the SIP PUBLISH message to the SIP Application Server 200. The SIP Application Server 200 determines whether the XML document is acceptable as accessed through the reference pointer to the XML document in the SIP PUBLISH message. If the SIP Application Server 200 determines the XML document is not acceptable, the SIP Application Server sends a SIP 200 OK response that requests a retransmission of only the XML document.

After replacing the XML document with the reference pointer in the SIP PUBLISH message, the optimizer gateway 300 asynchronously processes the XML document in a separate execution thread. An example of separate execution thread may be, inter alia, a Java™ thread, etc. Asynchronous processing by the optimizer gateway transforms XML documents into a form that can be more easily processed with existing XML document processing technologies. An example of XML document processing technology may be, inter alia, a DataPower XML appliance of IBM WebSphere DataPower Service Oriented Architecture (SOA) appliances. Later, responsive to being requested for retransmission by the SIP Application Server, the optimizer gateway retransmits the XML document.

If the SIP Application Server 200 determines the XML document is acceptable, the SIP Application Server 200 returns a 200 OK response that indicates the request to publish presence information was successfully received. The optimizer gateway receives and forwards the 200 OK response to the second client 20-2.

Subsequent to sending out 200 OK response to the second client, the SIP Application Server 200 notifies the first client 20-1 that there is a change in presence information of the second client 20-2 because the first client subscribes to the presence information of the second client. Thus, the SIP application server sends a SIP NOTIFY message which embeds XML documents pertaining presence information of the second client 20-2.

The optimizer gateway 300 intercepts the SIP NOTIFY message and refers to the subscriber profile database to determine Quality of Service (QoS) settings to apply for the SIP NOTIFY message. In one embodiment, a Quality of Service option is that a link between the first client and the optimizer gateway remains open and the first client 20-1 requests for the XML document later from the optimizer gateway when necessary. In another embodiment, a Quality of Service option is that the XML document is reinstated instead of the reference pointer to the XML document in the SIP NOTIFY message so that the first client 20-1 receives the XML document in its entirety at the same time that the first client 20-1 receives the SIP NOTIFY message.

Figure 5:
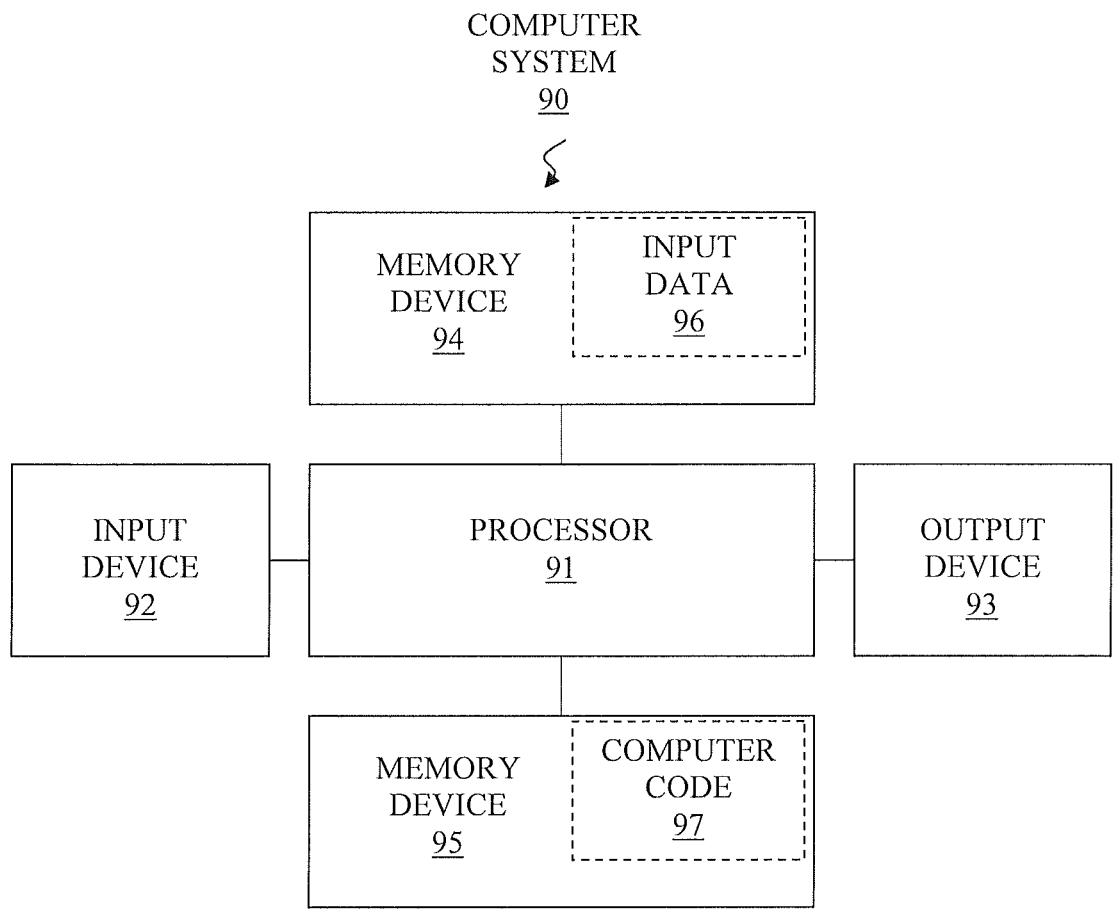
FIG. 5 illustrates a computer system used for optimizing an Extensible Markup Language (XML) traffic within Session Initiation Protocol (SIP) messages, in accordance with embodiments of the present invention.

FIG. 5 illustrates a computer system 90 used for optimizing an Extensible Markup Language (XML) traffic within Session Initiation Protocol (SIP) messages, in accordance with embodiments of the present invention.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 95 includes a computer code 97 which is a computer program that comprises computer-executable instructions. The computer code 97 includes, inter alia, an algorithm used for optimizing XML traffic in SIP messages according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may be used as a computer usable medium (or a computer readable medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable medium (or said program storage device).

Any of the components of the present invention can be deployed, managed, serviced, etc. by a service provider that offers to deploy or integrate computing infrastructure with respect to a process for optimizing XML traffic in SIP messages of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for optimizing XML traffic in SIP messages.

In another embodiment, the invention provides a business method that performs the process steps of the invention on a subscription, advertising and/or fee basis. That is, a service provider, such as a Solution Integrator, can offer to create, maintain, support, etc. a process for optimizing XML traffic in SIP messages of the present invention. In this case, the service provider can create, maintain, and support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for optimizing a data file in a signaling stream of a network system, the method comprising:

intercepting a first message embedding the data file within the first message, the first message comprising an updated presence information of a subscribed client published by the subscribed client to an application server, wherein presence information comprises a status indicator as to communicability of clients, wherein a subscribing client subscribes to events occurring on the subscribed client, wherein the application server provides presence service which accepts, stores and distributes said presence information of clients registered with a control server, wherein the subscribed client and the subscribing client are registered with the control server, wherein the network system comprises clients, the control server, an optimizer gateway, and the application server;

subsequent to said intercepting the first message, optimizing the first message pursuant to a first quality of service requirement for the first message stored in a subscriber profile database, wherein said optimizing the first message results in an optimized first message;

subsequent to said optimizing the first message, forwarding the optimized first message to the application server;

subsequent to said forwarding the optimized first message, relaying a second message from the application server to the subscribed client, wherein the second message acknowledges that the application server successfully received the optimized first message;

subsequent to said forwarding the second message, intercepting a third message from the application server to the subscribing client, wherein the third message comprises the updated presence information in the intercepted first message;

subsequent to said intercepting the third message, optimizing the third message pursuant to a second quality of service requirement for the third message stored in the subscriber profile database, wherein said optimizing the third message results in an optimized third message; and subsequent to said optimizing the third message, forwarding the optimized third message to the subscribing client, wherein said intercepting the first message, said optimizing the first message, said forwarding the first message, said relaying the second message, said intercepting the third message, said optimizing the third message, and said forwarding the third message are performed by the optimizer gateway, wherein the optimizer gateway communicates with both the application server and the control server, wherein the signaling stream comprises the first message, the second message, and the third message.

2. The method of claim 1, said optimizing the first message comprising:
retrieving the first quality of service requirement for the first message stored in the subscriber profile database;
subsequent to said retrieving, extracting the data file from the first message;
subsequent to said extracting, storing the extracted data file in a storage medium of the optimizer gateway; and
subsequent to said extracting, replacing the data file embedded within the first message with a reference pointer to the stored data file.

3. The method of claim 1, wherein the data file is stored in a storage medium of the optimizer gateway subsequent to said intercepting the first message, and wherein said optimizing the third message comprises replacing a reference pointer to the stored data file with the data file within the third message.

4. The method of claim 1, the method further comprising:
subsequent to said optimizing the first message, asynchronously processing the data file;
subsequent to said asynchronously processing the data file, receiving from the application server a request for retransmission of the data file to the application server; and
responsive to said receiving the request, transmitting the data file to the application server.

5. The method of claim 1, the method further comprising:
subsequent to said forwarding the third message, maintaining a communication link between the subscribing client and the optimizer gateway to enable later transfer of the data file; and
responsive to a request by the subscribing client for retransmission of the data file to the subscribing client, sending the data file to the subscribing client.

6. The method of claim 1, wherein the signaling stream communicates pursuant to Session Initiation Protocol, wherein the network system is an Internet Protocol Multimedia Subsystem (IMS), wherein the control server is a Serving-Call/Session Control Function (S-CSCF) of the Internet Protocol Multimedia Subsystem, wherein the application server is a Session Initiation Protocol Application Server (SIP A/S), wherein the first message is a Session Initiation Protocol PUBLISH request message, wherein the second message is a Session Initiation Protocol 200 OK response message, and wherein the third message is a Session Initiation Protocol NOTIFY response message.

7. A computer program product, comprising a computer usable storage device storing a computer readable program code embodied therein, said computer readable program code containing instructions that when executed by a processor of a computer system implement a method for optimizing a data file in a signaling stream of a network system, the method comprising:
intercepting a first message embedding the data file within the first message, the first message comprising an updated presence information of a subscribed client published by the subscribed client to an application server, wherein presence information comprises a status indicator as to communicability of clients, wherein a subscribing client subscribes to events occurring on the subscribed client, wherein the application server provides presence service which accepts, stores and distributes said presence information of clients registered with a control server, wherein the subscribed client and the subscribing client are registered with the control server, wherein the network system comprises clients, the control server, an optimizer gateway, and the application server;
subsequent to said intercepting the first message, optimizing the first message pursuant to a first quality of service requirement for the first message stored in a subscriber profile database, wherein said optimizing the first message results in an optimized first message;
subsequent to said optimizing the first message, forwarding the optimized first message to the application server;
subsequent to said forwarding the optimized first message, relaying a second message from the application server to the subscribed client, wherein the second message acknowledges that the application server successfully received the optimized first message;
subsequent to said forwarding the second message, intercepting a third message from the application server to the subscribing client, wherein the third message comprises the updated presence information in the intercepted first message;
subsequent to said intercepting the third message, optimizing the third message pursuant to a second quality of service requirement for the third message stored in the subscriber profile database, wherein said optimizing the third message results in an optimized third message; and
subsequent to said optimizing the third message, forwarding the optimized third message to the subscribing client,
wherein said intercepting the first message, said optimizing the first message, said forwarding the first message, said relaying the second message, said intercepting the third message, said optimizing the third message, and said forwarding the third message are performed by the optimizer gateway, wherein the optimizer gateway communicates with both the application server and the control server,
wherein the signaling stream comprises the first message, the second message, and the third message.

8. The computer program product of claim 7, said optimizing the first message comprising:
retrieving the first quality of service requirement for the first message stored in the subscriber profile database;
subsequent to said retrieving, extracting the data file from the first message;
subsequent to said extracting, storing the extracted data file in a storage medium of the optimizer gateway; and
subsequent to said extracting, replacing the data file embedded within the first message with a reference pointer to the stored data file.

9. The computer program product of claim 7, wherein the data file is stored in a storage medium of the optimizer gateway subsequent to said intercepting the first message, and wherein said optimizing the third message comprises replacing a reference pointer to the stored data file with the data file within the third message.

10. The computer program product of claim 7, the method further comprising:
subsequent to said optimizing the first message, asynchronously processing the data file;
subsequent to said asynchronously processing the data file, receiving from the application server a request for retransmission of the data file to the application server; and
responsive to said receiving the request, transmitting the data file to the application server.

11. The computer program product of claim 7, the method further comprising:

subsequent to said forwarding the third message, maintaining a communication link between the subscribing client and the optimizer gateway to enable later transfer of the data file; and responsive to a request by the subscribing client for retransmission of the data file to the subscribing client, sending the data file to the subscribing client.

12. The computer program product of claim 7, wherein the signaling stream communicates pursuant to Session Initiation Protocol, wherein the network system is an Internet Protocol Multimedia Subsystem (IMS), wherein the control server is a Serving-Call/Session Control Function (S-CSCF) of the Internet Protocol Multimedia Subsystem, wherein the application server is a Session Initiation Protocol Application Server (SIP A/S), wherein the first message is a Session Initiation Protocol PUBLISH request message, wherein the second message is a Session Initiation Protocol 200 OK response message, and wherein the third message is a Session Initiation Protocol NOTIFY response message.

13. A computer system comprising a processor and a computer readable memory unit coupled to the processor, said memory unit containing instructions that when executed by the processor implement a method for optimizing a data file in a signaling stream of a network system, the method comprising:

intercepting a first message embedding the data file within the first message, the first message comprising an updated presence information of a subscribed client published by the subscribed client to an application server, wherein presence information comprises a status indicator as to communicability of clients, wherein a subscribing client subscribes to events occurring on the subscribed client, wherein the application server provides presence service which accepts, stores and distributes said presence information of clients registered with a control server, wherein the subscribed client and the subscribing client are registered with the control server, wherein the network system comprises clients, the control server, an optimizer gateway, and the application server;

subsequent to said intercepting the first message, optimizing the first message pursuant to a first quality of service requirement for the first message stored in a subscriber profile database, wherein said optimizing the first message results in an optimized first message;

subsequent to said optimizing the first message, forwarding the optimized first message to the application server;

subsequent to said forwarding the optimized first message, relaying a second message from the application server to the subscribed client, wherein the second message acknowledges that the application server successfully received the optimized first message;

subsequent to said forwarding the second message, intercepting a third message from the application server to the subscribing client, wherein the third message comprises the updated presence information in the intercepted first message;

subsequent to said intercepting the third message, optimizing the third message pursuant to a second quality of service requirement for the third message stored in the subscriber profile database, wherein said optimizing the third message results in an optimized third message; and subsequent to said optimizing the third message, forwarding the optimized third message to the subscribing client, wherein said intercepting the first message, said optimizing the first message, said forwarding the first message, said relaying the second message, said intercepting the third message, said optimizing the third message, and said forwarding the third message are performed by the optimizer gateway, wherein the optimizer gateway communicates with both the application server and the control server, wherein the signaling stream comprises the first message, the second message, and the third message.

14. The computer system of claim 13, said optimizing the first message comprising:

retrieving the first quality of service requirement for the first message stored in the subscriber profile database;

subsequent to said retrieving, extracting the data file from the first message;

subsequent to said extracting, storing the extracted data file in a storage medium of the optimizer gateway; and subsequent to said extracting, replacing the data file embedded within the first message with a reference pointer to the stored data file.

15. The computer system of claim 13, wherein the data file is stored in a storage medium of the optimizer gateway subsequent to said intercepting the first message, and wherein said optimizing the third message comprises replacing a reference pointer to the stored data file with the data file within the third message.

16. The computer system of claim 13, the method further comprising:

subsequent to said optimizing the first message, asynchronously processing the data file;

subsequent to said asynchronously processing the data file, receiving from the application server a request for retransmission of the data file to the application server; and responsive to said receiving the request, transmitting the data file to the application server.

17. The computer system of claim 13, the method further comprising:

subsequent to said forwarding the third message, maintaining a communication link between the subscribing client and the optimizer gateway to enable later transfer of the data file; and responsive to a request by the subscribing client for retransmission of the data file to the subscribing client, sending the data file to the subscribing client.

18. The computer system of claim 13, wherein the signaling stream communicates pursuant to Session Initiation Protocol, wherein the network system is an Internet Protocol Multimedia Subsystem (IMS), wherein the control server is a Serving-Call/Session Control Function (S-CSCF) of the Internet Protocol Multimedia Subsystem, wherein the application server is a Session Initiation Protocol Application Server (SIP A/S), wherein the first message is a Session Initiation Protocol PUBLISH request message, wherein the second message is a Session Initiation Protocol 200 OK response message, and wherein the third message is a Session Initiation Protocol NOTIFY response message.

* * * * *